Feb. 16, 1937.  J. CRITES  2,070,650
SEPARATOR
Filed July 17, 1935   3 Sheets-Sheet 1
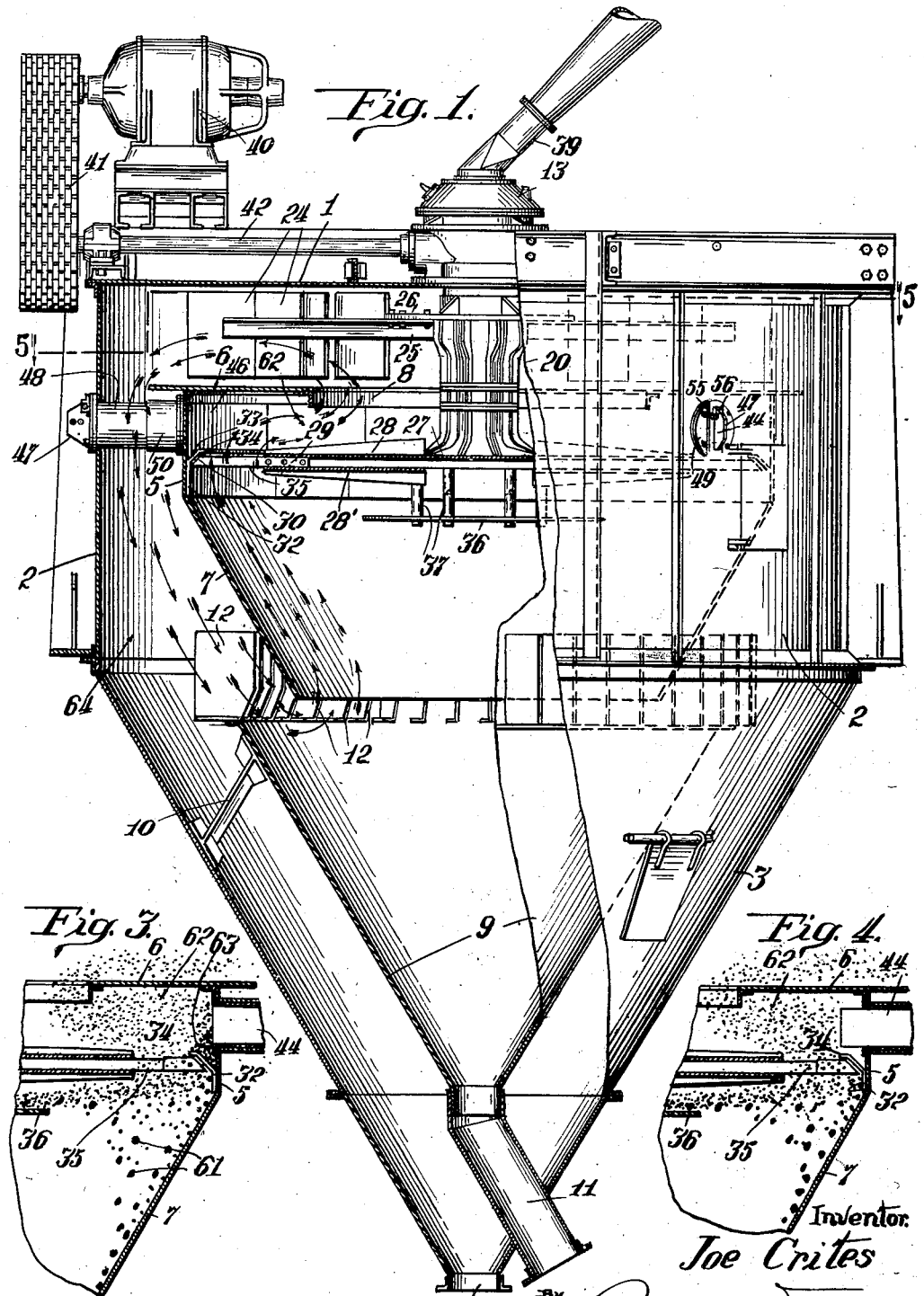
Inventor
Joe Crites
By Barnett & Truman
Attorneys

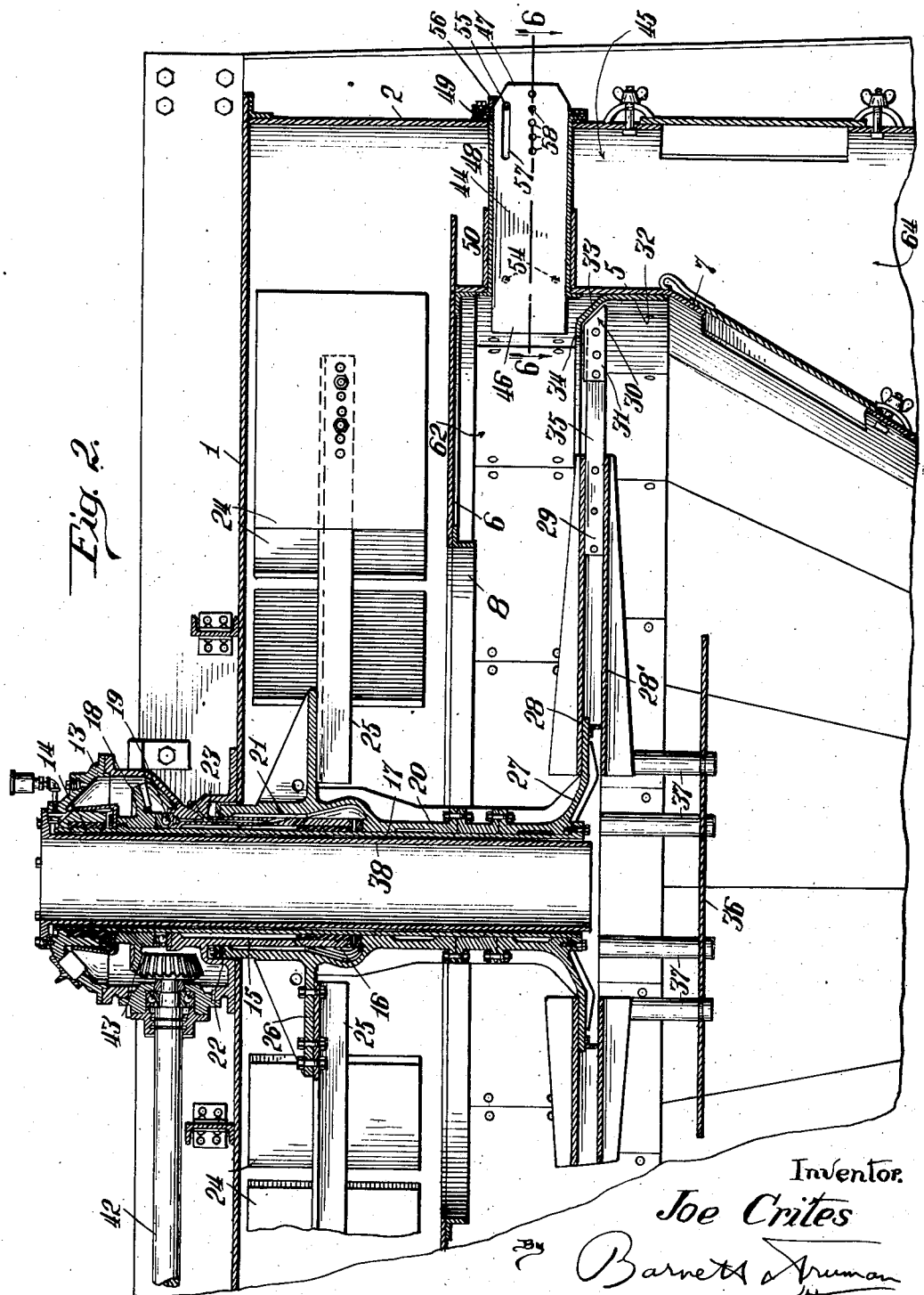

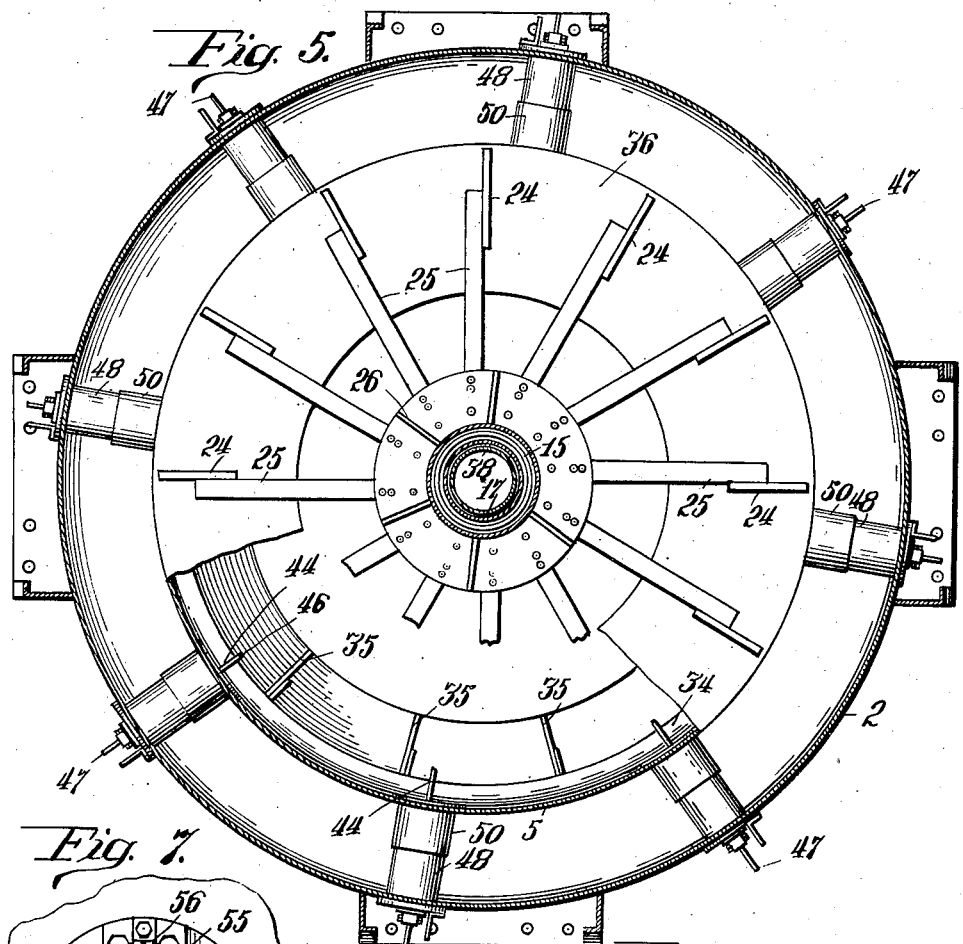
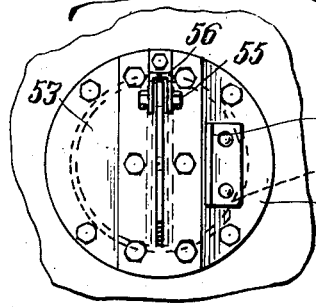
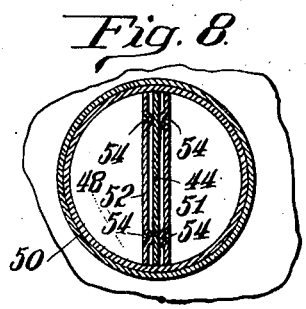
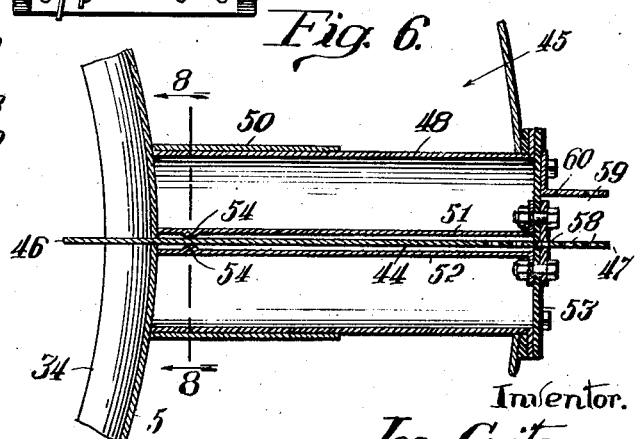
Inventor.
Joe Crites

Patented Feb. 16, 1937

2,070,650

UNITED STATES PATENT OFFICE 2,070,650

SEPARATOR

Joe Crites, Evanston, Ill., assignor to Raymond Brothers Impact Pulverizer Company, Chicago, Ill., a corporation of Illinois Application July 17, 1935, Serial No. 31,856

19 Claims. (Cl. 209—139)

REISSUED

This invention relates to certain new and useful improvements in mechanical separators, and more particularly to improvements in that type of separator in which the finely divided material to be graded is projected by centrifugal force across the path of a rising air current which picks up and carries away in suspension only the finer particles, whereas the heavier particles gravitate out of the air stream into a collecting means. A separator of this type is disclosed in the patent to Cook 1,783,357, granted December 2, 1930.

The present improvements relate to means for grading or determining, within certain limits, the fineness of the material that is delivered from the separator. In this general type of separator, a rotary deflecting member is mounted on a central vertical axis within the separation chamber and above the rotary distributor so as to cut across the annular rising air stream. This rotary deflector preferably comprises a multiplicity of radial blades or vanes, the central portions of which are connected by a disk or covering plate so that air passages remain only between the outer portions of the vanes. The outer ends of the vanes closely abut a conical deflecting member that extends upwardly and inwardly so as to overlap the outer ends of the vanes. The rotating vanes throw the heavier particles of material outwardly against the inclined lower surface of the deflecting ring from which they carom downwardly at the sides of the chamber and join the heavier material that initially gravitates out and is too heavy to rise into the rotary deflector. The only material that can rise above the cooperating deflecting members is sufficiently fine to be carried in suspension in the rising air streams between the rapidly rotating deflector blades.

Above the deflecting members and between them and the fan which causes the rising air stream, is an inwardly extending annular partition wall which compels the air ladened with finely divided material to flow inwardly before entering the fan chamber. This annular space between the deflecting members and the partition serves as a final separation chamber. The heavier portion of the material that finds its way above the deflectors is carried outwardly by centrifugal force and deposited upon the ledge above the fixed deflector ring, from which these heavier particles gradually slide back through the rotary deflector and thence downwardly through the casing together with the other heavier rejected materials.

According to the present improvements, a plurality of damper means, preferably in the form of vertical vanes projecting radially inward, are positioned in the outer portion of the annular separating space between the partition and stationary deflector. As will be hereinafter described more in detail, eddy currents are set up between these vanes or dampers so as to prevent the depositing of materials on the ledge above the stationary deflector, and as a result the farther these vanes are adjusted inwardly (between their limits of movement) the greater the percentage of heavy material that will be carried out in suspension in the air stream. Conversely, as these vanes are withdrawn or adjusted outwardly, the fineness of the delivered material will be increased.

The general object of this invention is to provide an improved separator of the type briefly described hereinabove and disclosed more in detail in the specifications which follow.

Another object is to provide an improved damper or valve means for grading the fineness of the separated material.

Other objects and advantages of this invention will be more apparent from the following detailed description of one improved form of apparatus constructed according to the principles of this invention.

In the accompanying drawings:

Fig. 1 is an elevation of the improved separator, some of the left-hand portions being shown in vertical section.

Fig. 2 is a central vertical section through the upper portion of the separator on a larger scale.

Fig. 3 is a partial vertical section corresponding to a right-hand portion of Fig. 2, illustrating diagrammatically the operation of the separator with the adjustable vanes completely withdrawn.

Fig. 4 is a view similar to Fig. 3 illustrating the operation with the vanes adjusted inwardly to their limit of movement.

Fig. 5 is a horizontal section taken substantially on the line 5—5 of Fig. 1, a lower portion of this view being broken away on a lower plane.

Fig. 6 is a horizontal section, on a larger scale, taken substantially on the line 6—6 of Fig. 2.

Fig. 7 is an end elevation looking at the right-hand end of the structure shown in Fig. 6.

Fig. 8 is a vertical section taken substantially on the line 8—8 of Fig. 6.

The separator housing comprises a suitably supported outer shell or casing consisting of a top wall 1, an upper cylindrical shell 2, and a downwardly conical shell 3 converging to the bottom discharge opening 4 through which the finely divided material separated out by this process is delivered. An inner casing, positioned symmetrically about the same central vertical axis as the outer casing but spaced inwardly therefrom, comprises an upper cylindrical shell 5 having an inwardly extending annular flange or cover plate 6 at its upper end, and a lower downwardly converging conical portion 7. This inner shell has an outlet opening 8 through the central portion of the flange or cover plate 6, and the lower conical shell 7 is open at its lower end so as to communicate with the larger upper end of a second conical shell 9 supported within shell 3 by the braces 10 and communicating at its smaller lower end with the spout 11 which extends out through one side of the outer conical shell 3 so as to discharge the heavier particles collected within the inner conical shells. A circular series of vertical baffle members 12 are positioned in the open annular channel between the lower end of conical shell 7 and the upper end of conical shell 9. As will be hereinafter brought out in more detail, a circulation of air is maintained upwardly through the inner shell 7 inwardly around the upper cover plate 6, then outwardly and around the cover plate 6 and downwardly through the outer channel between the inner and outer shells, then inwardly between the baffles 12 and upwardly into the lower end of conical shaft 7. This air circulation is indicated by the small arrows at the left-hand side of Fig. 1.

The upper stationary housing carries the central gear casing 13 in which is the upper vertical bearing 14, the gear casing having a downwardly extending tubular portion 15 carrying the lower bearing 16 aligned with the upper bearing 14.

The rotating assembly comprises the central vertical supporting tube 17 which is journaled in the bearings 14 and 16, and which has secured thereon the beveled gear 18 which rests on the antifriction bearing 19 so as to support the rotatable assembly. The assembled supporting frame 20 mounted on the lower end portion of rotating tube 17, comprises an upwardly extending tubular portion 21 which encloses the downwardly extending stationary tube 15 and terminates at its upper end in a sealing member 22 rotatable within the annular cavity 23 in the lower portion of gear casing 13.

The fan which maintains the air circulation already described comprises a circular series of propeller blades 24 which revolve in the space or fan chamber above the flange or cover plate 6 and below the top wall 1, each blade being carried by an arm 25 which is secured to the annular bracket 26 carried by the supporting tube 21.

The rotary deflector comprises a supporting skirt 27 extending outwardly from the lower end of rotary frame 20 and supporting the upper and lower discs 28 and 28' between which are secured the inner end portions of the blades or vanes 29 which are arranged in a circular series and have their outer end portions projecting radially into proximity to the surounding cylindrical wall 5 of the inner casing. The outer ends of these vanes are beveled outwardly and downwardly as indicated at 30 and are provided with reinforcing plates 31. The cooperating annular stationary deflector comprises a vertical supporting wall 32 which is secured to the shell wall 5, and upwardly and inwardly projecting conical portion 33 which extends over the beveled end portions 30 of the vanes, and an inwardly projecting flange 34 which overlaps the outer upper sides of the vanes. It will be noted that the only space that is open for the upward passage of the air and suspended material comprises the annular series of openings between the exposed portions 35 of the vanes, and between the outer edges of the discs 28—28' and the inner edge of the stationary deflector.

The distributing disk 36 is carried by a plurality of struts 37 extending downwardly from the rotating deflector frame just described. A stationary inner delivery tube 38 is supported at its upper end by the gear casing 13 and projects downwardly through the rotary supporting tube 17. The material to be separated is delivered by any convenient means such as the spout 39 (Fig. 1) into the upper end of tube 38 and thence discharged downwardly onto the rapidly rotating distributing disk 36.

The rotating assembly may be driven in any suitable manner. As here shown a motor 40 mounted on the top of the housing is connected through chain or belt gearing 41 with the outer end of a horizontal drive shaft 42 carrying the bevel pinion 43 which meshes with bevel gear 18 already described. If desired change-speed gearing can be interposed between the motor and drive shaft 42 so as to vary the speed at which the rotating assembly is driven.

The separator as thus far described operates in much the same manner as the separator disclosed in the patent to Cook 1,783,357, hereinabove referred to, but before stating this operation in detail we will describe the regulating vanes 44 which have been added as a part of the improvements herein disclosed and claimed.

These vanes or dampers 44 are arranged in an annular series spaced equally about the circumference of the separator, there being eight of these damper assemblies in the construction here shown by way of example. It will be understood that any suitable number of these dampers could be used. Each of these members 44 is in the form of a vertically positioned plate of sufficient length to project through the space 45 between the outer shell 2 and the inner shell 5, with the inner end portion 46 of the plate extending through shell 5 and projecting substantially in vertical alignment with the inner end of the stationary deflector flange 34, and the outer end portion 47 of the plate projecting out through wall 2 to an accessible position. The plate 44 is slidably mounted in the tubular-guide housing 48 which projects through an opening in the outer shell 2 and has a flange 49 bolted to this outer shell. The inner end portion of the housing 48 is mounted in a tubular sleeve 50 projecting outwardly from the inner shell 5. A vertical guide slot extending throughout the length of the housing 48 is formed between a pair of spaced apart partition members 51 and 52, the ends of this guide slot being open but the remaining end portions of the housing means closed as indicated at 53 in Fig. 7. The slot is of somewhat greater width than the plate 44, the partition members being provided with inwardly projecting bosses 54 which contact with and slidably guide the plate 44. This is to prevent the plate from becoming jammed in position within the slot when loose material finds its way into the slot at the sides of the plate. A bolt 55 mounted in a yoke 56 carried at the outer end of the housing 48 projects through a slot 57 in the damper 44, thus limiting the inward or outward movement of the damper. A plurality of holes 58 are formed in the outer end portion of the damper 44, and a similar hole 59 is provided in an angular bracket plate 60 secured to the outer face of the housing. By inserting a suitable tool through the opening 59 and engaging one of the openings 58, the plate 44 may be manipulated in or out to the desired adjusted position. It can be secured in this selected position by tightening the screw bolt 55.

The operation of the separator can be best explained by referring to the diagrammatic showings in Figs. 3 and 4. Fig. 3 illustrates the operation with the dampers 44 completely withdrawn, that is the inner ends 46 are pulled back substantially flush with the wall 5 of the inner shell. The material introduced through spout 39 and tube 38 will be thrown outwardly by the centrifugal distributing plate 36 and diffused across the rising air current within the inner casing. Only the lighter and finer particles are carried upwardly by the rising air current created by fan 24, the heavier particles 61 gravitating downwardly through the inner shells 7 and 9 and out through spout 11. Some of these heavier particles will be thrown against the casing walls 5 and 7 and will thence gravitate downwardly. As soon as the material particles carried in the rising air stream are caught by the revolving blades or vanes 35, the heavier particles will be caught by these blades and thrown outwardly against the under surface of the stationary deflector 33 from which they will be thrown downwardly to join the other heavier particles that have already separated out. The central disk or apron 28 prevents the passage of any materials between the inner portions of the rotating blades which are not traveling at as great a linear speed, and the only material that can be carried above these cooperating deflector members is the very fine material that may be carried in the air stream passing through the spaces between the rapidly rotating vanes 35.

The final separation and grading process with which we are here particularly concerned takes place in the separating chamber 62 above the rotary deflector and below the annular partition or cover plate 6. It will be noted that the outer portion of this separating chamber extends over the stationary deflector 34. The air laden with fine material which has passed through the whirling deflector 35 into separating chamber 62 must flow inwardly around the partition 6 and up through central opening 8 before it can enter the fan chamber. While this air is whirling around the central axis within separating chamber 62, the heavier particles of the material still remaining in suspension will be thrown outwardly and will be deposited on the ledge formed by the stationary deflector members 33 and 34, as indicated at 63 in Fig. 3. This deposit of material will build up on the ledge until the angle of repose has been reached, after which additional material will slide down and fall between the rotating deflector blades 35 and eventually be carried down with the other heavier material through the inner shafts 7 and 9. Only the very fine particles of material will be carried inwardly by the air stream and thence up into the fan chamber. This material-laden air is forced outwardly by the fan and thence downwardly through passage 45 between the inner and outer shells. Since this air stream is still whirling through the annular space 45 (due to the force imparted thereto by the fan) it would impinge broadside on the vanes 44 and be impeded thereby were it not for the fact that these vanes are inclosed in the cylindrical housings 48 which lessen the resistance to the circulating air stream. As this air stream flows downwardly into the larger lower portion 64 of passage 45, the air stream will expand and lose velocity, and the material carried thereby will gravitate out and be deposited within the outer conical shell 3 so as to gravitate out through the lower opening 4. The air stream is drawn inwardly through the openings between the baffle plates 12 thus causing a further deposition of material in the outer shell 3. The air stream, relieved of its burden, is drawn upwardly within the inner shell 7 and the process is repeated.

As shown in Fig. 4, the dampers or regulating plates 44 are adjusted inwardly so that their inner ends 46 are substantially flush with the inner edge of the stationary deflector 34. At such times, eddy currents will be set up between the successive pairs of regulating plates so as to substantially prevent the deposition of any material above the ledge 34, and substantially all of the material that is carried up to the openings in the rotary deflector will be carried out in suspension in the air stream and deposited in the outer shell 3.

It will be understood that the material separated out by this apparatus will be reasonably fine in any case, since only the finer particles of material can find their way upwardly through the openings in the rotary deflector into the separating chamber 62. However, with the regulating vanes 44 completely withdrawn, the finest grade of material will be separated out, whereas with the regulating vanes moved in to the extreme position shown in Fig. 4 the maximum percentage of heavier particles will be permitted to flow through into the outer shell. By adjusting the regulating vanes 44 to intermediate positions, intermediate grades of material may be obtained. For example, in one typical machine of this type it has been found that with the vanes 44 completely withdrawn, substantially 99.5% of the material separated out will pass through a 200 mesh screen. With the regulating vanes adjusted to the extreme inner position as shown in Fig. 4, substantially 93.8% of the material will pass through a 200 mesh screen. With the vanes in an intermediate or midway position, substantially 95% of the material will pass through a 200 mesh screen, and other percentages can be obtained by adjusting the vanes to other alternative positions. Therefore, by simply adjusting the positions of the plates 44, which are easily accessible from outside the apparatus, the grade of material obtained can be selected, all other conditions remaining unchanged.

I claim:

1. In a separator, a casing, means comprising rotary members for creating an upward flow of air through the casing, for distributing solid material into the upwardly flowing air stream, and for restricting the upward flow of solid materials in suspension in the air stream, inwardly projecting spaced apart annular members in the upper portion of the casing for defining an inwardly open annular separating space above the restricting means, and adjustable damper means positioned in the outer portion of this separating space.

2. In a separator, a casing, means comprising rotary members for creating an upward flow of air through the casing, for distributing solid material into the upwardly flowing air stream, and for restricting the upward flow of solid materials in suspension in the air stream, inwardly projecting spaced apart annular members in the upper portion of the casing for defining an inwardly open annular separating space above the restricting means and an annular series of vertically positioned regulating vanes projecting radially inward from the casing wall within the separating space, and means accessible from outside the casing for adjusting the vanes radially.

3. In a separator, a casing, a rotary distributor therein, a rotary deflector positioned above the distributor and having an annular series of openings therein, means for causing an upward flow of air through the casing and through the openings in the deflector, there being inwardly projecting spaced apart annular members in the upper portion of the casing for defining an annular separating space above the deflector and extending outwardly beyond the series of openings, and adjustable damper means positioned in the separating space.

4. In a separator, a casing, a rotary distributor therein, a rotary deflector positioned above the distributor and having an annular series of openings therein, means for causing an upward flow of air through the casing and through the openings in the deflector, there being inwardly projecting spaced apart annular members in the upper portion of the casing for defining an annular separating space above the reflector and extending outwardly beyond the series of openings, and adjustable damper means positioned in the outwardly extending portion of the separating space.

5. In a separator, a casing, a rotary distributor therein, a rotary deflector positioned above the distributor and having an annular series of openings therein, means for causing an upward flow of air through the casing and through the openings in the deflector, there being inwardly projecting spaced apart annular members in the upper portion of the casing for defining an annular separating space above the deflector and extending outwardly beyond the series of openings, and an annular series of spaced apart vertically positioned regulating vanes projecting radially inward through the outwardly extending portion of the separating space.

6. In a separator, a casing, a rotary distributor therein, a rotary deflector positioned above the distributor and comprising an annular series of radially extending vanes, an annular stationary deflector carried by the casing and closely overlapping the outer end portions of the vanes, means for causing an upward flow of air through the casing and between the vanes, and adjustable damper means positioned in the annular space above the stationary deflector.

7. In a separator, a casing, a rotary distributor therein, a rotary deflector positioned above the distributor and comprising an annular series of radially extending vanes, an annular stationary deflector carried by the casing and closely overlapping the outer end portions of the vanes, means for causing an upward flow of air through the casing and between the vanes, an annular series of vertically positioned regulating vanes projecting radially inward within the annular space above the stationary deflector, and means for adjusting the vanes radially.

8. In a separator, a casing, a rotary distributing member therein, said casing having an inwardly extending annular cover-plate at its upper end surrounding a central outlet opening, means for causing an upward flow of air through the casing and out through the opening, a rotary deflector positioned above the distributor but spaced below the cover-plate, an annular deflector carried by the casing and closely overlapping the outer portion of the rotary deflector, and an annular series of spaced apart adjustable regulating vanes projecting inwardly from the casing wall into the space between the annular deflector and the cover-plate.

9. In a separator, a casing, a rotary distributing member therein, said casing having an inwardly extending annular cover-plate at its upper end surrounding a central outlet opening, means for causing an upward flow of air through the casing and out through the opening, a rotary deflector positioned above the distributor but spaced below the cover-plate, an annular deflector carried by the casing and closely overlapping the outer portion of the rotary deflector, and an annular series of spaced apart vertically positioned regulating vanes projecting radially inward from the casing between the annular deflector and the cover-plate.

10. In a separator, a casing, a rotary distributing member therein, said casing having an inwardly extending annular cover-plate at its upper end surrounding a central outlet opening, means for causing an upward flow of air through the casing and out through the opening, a rotary deflector positioned above the distributor but spaced below the cover-plate, an annular deflector carried by the casing and closely overlapping the outer portion of the rotary deflector, and adjustable damper means positioned in the space between the annular deflector and the cover-plate.

11. In a separator, an outer shell, an inner casing supported within the shell so as to provide an annular space therebetween, means comprising rotary members for creating a circulation of air upwardly through and around the casing, for distributing solid material into the upwardly flowing air stream, and for restricting the upward flow of solid materials in suspension in the air stream, means leading separately from the lower portions of the shell and casing for collecting the solid materials deposited from the air stream in each, spaced apart annular means projecting inwardly from the casing wall above the rotary restricting member for defining an inwardly open annular separating space in the upper portion of the casing, and adjustable damper means positioned in the outer portion of this separating space.

12. In a separator, an outer shell, an inner casing supported within the shell so as to provide an annular space therebetween, means comprising rotary members for creating a circulation of air upwardly through and around the casing, for distributing solid material into the upward flowing air stream, and for restricting the upward flow of solid materials in suspension in the air stream, means leading separately from the lower portions of the shell and casing for collecting the solid materials deposited from the air stream in each, spaced apart annular means projecting inwardly from the casing wall above the rotary restricting member for defining an inwardly open annular separating space in the upper portion of the casing, an annular series of vertically positioned regulating vanes projecting radially inward from the casing wall within the separating space, and means accessible from outside the shell for adjusting the vanes radially.

13. In a separator, an outer shell, an inner casing supported within the shell so as to provide an annular space therebetween, means comprising rotary members for creating a circulation of air upwardly through and around the casing, for distributing solid material into the upwardly flowing air stream, and for restricting the upward flow of solid materials in suspension in the air stream, means leading separately from the lower portions of the shell and casing for collecting the solid materials deposited from the air stream in each, means for defining an inwardly open annular separating space in the upper portion of the casing, an annular series of vertically positioned horizontally slidable regulating vanes projecting radially inward through the shell and casing walls into the outer portion of the separating space, and a cylindrical deflecting casing of greater diameter than the maximum width of the vane which houses that portion of each vane extending between the shell and inner casing, the outer ends of the vanes being accessible for adjusting the vanes radially.

14. In a separator, an outer shell, an inner casing having an inwardly extending annular flange at its upper end to provide a restricted upper outlet opening, a rotary assembly positioned within the casing comprising a rotary distributor, a rotary deflector positioned above the distributor but spaced downwardly from the annular flange, an annular member extending inwardly above the outer portion of the deflector to provide a separating space between this member and the upper annular flange, and a rotary fan positioned above the flange and functioning to provide a circulation of air upwardly through the casing and downwardly around the casing between the casing and shell, means leading separately from the lower portions of the shell and casing for collecting the solid materials deposited from the air stream in each, there being an annular series of openings in the outer portion of the rotary deflector through which the air with suspended materials must pass upwardly, and adjustable damper means positioned in the outer portion of the separating space.

15. In a separator, an outer shell, an inner casing having an inwardly extending annular flange at its upper end to provide a restricted upper outlet opening, a rotary assembly positioned within the casing comprising a rotary distributor, a rotary deflector positioned above the distributor but spaced downwardly from the annular flange, an annular member extending inwardly above the outer portion of the deflector to provide a separating space between this member and the upper annular flange, and a rotary fan positioned above the flange and functioning to provide a circulation of air upwardly through the casing and downwardly around the casing between the casing and shell, means leading separately from the lower portions of the shell and casing for collecting the solid materials deposited from the air stream in each, there being an annular series of openings in the outer portion of the rotary deflector through which the air with suspended materials must pass upwardly, and an annular series of vertically positioned regulating vanes projecting radially inward through the casing wall into the outer portion of the separating space, and means accessible from outside the shell for adjusting the vanes radially.

16. In a separator, an outer shell, an inner casing having an inwardly extending annular flange at its upper end, a rotary assembly positioned within the casing comprising a rotary distributor, a rotary deflector positioned above the distributor but spaced downwardly from the annular flange to provide a separating space therebetween, and a rotary fan positioned above the flange and functioning to provide a circulation of air upwardly through the casing and downwardly around the casing between the casing and shell, means leading separately from the lower portions of the shell and casing for collecting the solid materials deposited from the air stream in each, the rotary deflector comprising a central disk portion, and a series of radially projecting vanes extending into proximity to the casing wall, a stationary annular deflector carried by the casing wall and overlapping the outer ends of the vanes, and adjustable damper means positioned in the outer portion of the separating space above the annular deflector.

17. In a separator, an outer shell, an inner casing having an inwardly extending annular flange at its upper end, a rotary assembly positioned within the casing comprising a rotary distributor, a rotary deflector positioned above the distributor but spaced downwardly from the annular flange to provide a separating space therebetween, and a rotary fan positioned above the flange and functioning to provide a circulation of air upwardly through the casing and downwardly around the casing between the casing and shell, means leading separately from the lower portions of the shell and casing for collecting the solid materials deposited from the air stream in each, the rotary deflector comprising a central disk portion, and a series of radially projecting vanes extending into proximity to the casing wall, a stationary annular deflector carried by the casing wall and overlapping the outer ends of the vanes, and an annular series of vertically positioned regulating vanes projecting radially inward from the casing wall above the stationary deflector and means for adjusting the vanes radially.

18. In a separator, an outer shell, an inner casing having an inwardly extending annular flange at its upper end, a rotary assembly positioned within the casing comprising a rotary distributor, a rotary deflector positioned above the distributor but spaced downwardly from the annular flange to provide a separating space therebetween, and a rotary fan positioned above the flange and functioning to provide a circulation of air upwardly through the casing and downwardly around the casing between the casing and shell, means leading separately from the lower portions of the shell and casing for collecting the solid materials deposited from the air stream in each, the rotary deflector comprising a central disk portion, and a series of radially projecting vanes extending into proximity to the casing wall, a stationary annular deflector carried by the casing wall and overlapping the outer ends of the vanes, and an annular series of vertically positioned regulating vanes projecting radially inward through the casing wall into the outer portion of the separating space above the annular deflector, and means accessible from outside the shell for adjusting the vanes radially.

19. In a separator, an outer shell, an inner casing having an inwardly extending annular flange at its upper end, a rotary assembly positioned within the casing comprising a rotary distributor, a rotary deflector positioned above the distributor but spaced downwardly from the annular flange to provide a separating space therebetween, and a rotary fan positioned above the flange and functioning to provide a circulation of air upwardly through the casing and downwardly around the casing between the casing and shell, means leading separately from the lower portions of the shell and casing for collecting the solid materials deposited from the air stream in each, the rotary deflector comprising a central disk portion, and a series of radially projecting vanes extending into proximity to the casing wall, a stationary annular deflector carried by the casing wall and overlapping the outer ends of the vanes, an annular series of vertically positioned regulating vanes projecting radially inward through the shell and casing into the outer portion of the separating space above the annular deflector, a cylindrical deflecting casing positioned about each vane between the shell and inner casing, and means positioned outside the shell for adjusting the vanes radially.

JOE CRITES.